United States Patent [19]

Murphy et al.

[11] 4,095,900
[45] Jun. 20, 1978

[54] OPTICAL TECHNIQUE FOR BACKGROUND SUPPRESSION

[76] Inventors: Randall E. Murphy, 62 Conant St., Acton, Mass. 01720; George A. Vanasse, 71 Old Stage Rd., Chelmsford, Mass. 01824; Alva T. Stair, Jr., 76 Jennie Dugan Rd., Concord, Mass. 01742

[21] Appl. No.: 713,749
[22] Filed: Aug. 12, 1976
[51] Int. Cl.² ............................................. G01B 9/02
[52] U.S. Cl. ................................ 356/106 S; 356/111
[58] Field of Search ....................... 356/82, 106 S, 113, 356/111

[56] References Cited

U.S. PATENT DOCUMENTS 3,897,154  7/1975  Hawes .......................... 356/106 S X

OTHER PUBLICATIONS

Connes et al., "Near-Infrared Planetary Spectra by Fourier Spectroscopy, I. Instruments and Results," JOSA, vol. 56, pp. 896–903, Jul. 1966.
Vanesse et al., "Double-Beaming Technique in Fourier Spectroscopy," Applied Optics, vol. 15, No. 2, pp. 290–291, Feb. 1976.

*Primary Examiner*—John K. Corbin
*Assistant Examiner*—Matthew W. Koren
*Attorney, Agent, or Firm*—Joseph E. Rusz; Jacob N. Erlich

[57] ABSTRACT

An optical technique utilized during target detection for suppressing background radiation. This optical technique incorporates therein an optical mask interposed between the background radiation containing a target and an interferometer capable of performing double-beaming in Fourier spectroscopy. The optical mask divides the field-of-view of the interferometer into a plurality of subfields-of-view, the subfields-of-view being divided into first beams of light containing the background radiation alone and second beams of light containing both the background and target radiation, thereby enabling the output of the interferometer to be in the form of an interferogram having structure due only to the target radiation.

7 Claims, 2 Drawing Figures

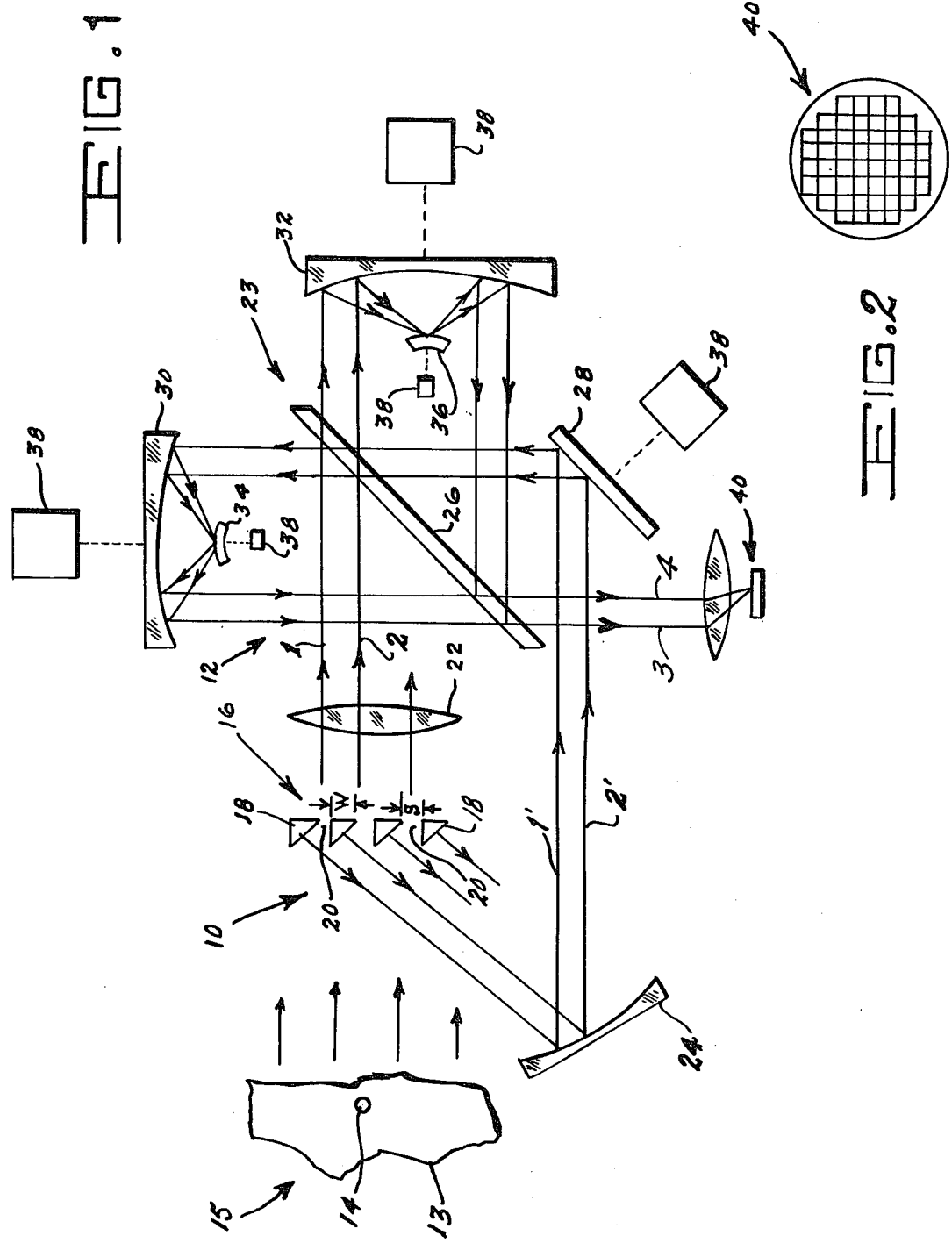

OPTICAL TECHNIQUE FOR BACKGROUND SUPPRESSION

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of spectroscopy, and, more particularly, a technique which is capable during target detection of suppressing structural background radiation but allowing for the detection of target radiation.

Spectroscopy is concerned with the production, measurement and interpretation of electromagnetic spectra arising from either emission or absorption of radiant energy by various substances. Emission spectra are produced when radiant energy from matter, excited by various forms of energy is passed through a slit and subsequently separated into its various components or wavelengths either by refraction in a transparent prism or by diffraction from a ruled grating or in a crystalline solid. The production of absorption spectra involves use of similar devices except that the excitation source is replaced by a suitable radiant energy source. Spectroscopic measurements of wavelengths and intensities of radiative energy are made using instruments called spectroscopes, spectrographs, spectrometers, or spectrophotometers.

Interpretation of the spectra provides information concerning atomic and molecular energy levels, electronic configurations of atoms and ions, molecular geometries, and chemical bonds. Empirical correlations of the spectral characteristics with chemical and physical properties of matter provide a basis for qualitative and quantitative chemical analysis.

The form of spectroscopy which has been found to be the most superior is that of Fourier spectroscopy. There are many reasons for this superiority, but the two most often referred to are the multiplex advantage and the aperture advantage. In addition, absolute wave number accuracy is guaranteed by the known wavelength used for carriage control, the physical apparatus is simple and both stray light and overlapping spectral orders are eliminated.

A double-beaming spectroscopy technique which has proven to be the most effective in overcoming many of the problems associated with Fourier spectroscopy is set forth in patent application Ser. No. 662,995 filed Mar. 1, 1976 by one of the inventors of the instant application. In this technique two beams are fed onto opposite faces of a beamsplitter of an interferometer. The output which is common to both beams is suppressed in the output interferogram; resulting in a measurement of only the desired or wanted radiation.

However, even with this technique the presence of large unwanted background radiation presents a problem for detection, location, tracking, homing and obtaining spectral information of faint sources or targets. Such a situation occurs, for example, in astronomy (stars, etc.) and surveillance of military targets.

SUMMARY OF THE INVENTION

The technique set forth in the instant invention overcomes the problem set forth hereinabove by allowing the observation of faint source(s) or target(s) without being encumbered by strong competing backgrounds. With this background suppression invention, the ability to observe faint source(s) is greatly enhanced. The essence of this invention is to direct the background radiation into an optical device such that the background radiation is divided into two components which are rendered complementary and consequently yield a constant value signal when recombined. Superimposed on one or the other background beam is the signal due to the weak source. This source signal retains all of its spectral characteristics which can be readily obtained. In addition, the technique of this invention is performed optically before the radiation reaches the detector and not electrically.

The instant invention includes an optical mask made up of a series of transmitting spaces and reflecting elements or portions which divides the scene radiation into the two beams. When the path difference in the interferometer is changed, the output interferogram contains structure due to the target only. If the path difference is fixed at zero path difference, the motion of the target across the mask will alternately generate a positive and negative signal. For a staring system, the period of this alternating signal yields velocity information about the target. Consequently, both target velocity and target spectral signatures may be obtained, while the background radiation is suppressed. Incorporating a multiple element detector array in the focal plane of the background suppression interferometer obtains the small fields-of-view required by optimum signal-to-noise (target-to-background) detection.

It is therefore an object of this invention to provide a technique for optically suppressing unwanted background radiation.

It is another object of this invention to provide a technique of suppressing unwanted background radiation and yet retains the spectral characteristics of the target radiation.

It is still another object of this invention to provide a technique for suppressing unwanted background radiation which minimizes the radiation falling on the detector, thus reducing the problem of detector saturation.

It is still a further object of this invention to provide a technique for suppressing unwanted background radiation which greatly reduces the dynamic range requirement for spectral recovery from an interferometer.

It is still another object of this invention to provide a technique for suppressing unwanted background radiation which is economical to produce and which utilizes conventional, currently available components.

For a better understanding of the present invention together with other and further objects thereof reference is made to the following description taken in conjunction with the accompanying drawing and its scope will be pointed out the appended claims.

DESCRIPTION OF THE DRAWING

FIG. 1 is a schematic representation of the apparatus of this invention utilized for the suppression of background incorporated within a system for performing double-beaming in Fourier spectroscopy; and FIG. 2 is an enlarged schematic representation of the detector array utilized with the apparatus of this invention.

DETAILED DESCRIPTION OF THE PREFERRED EMBODIMENT

Reference is now made to FIG. 1 of the drawing which schematically illustrates the apparatus 10 for optically suppressing background radiation while permitting the detection of target radiation. Apparatus 10 is incorporated within any apparatus 12 capable of performing the technique of double-beaming in Fourier spectroscopy. Examples of such techniques have been set forth in patent application Ser. No. 662,995 filed Mar. 1, 1976 by one of the inventors of this application.

Generally the presence of large unwanted background radiation 13 presents a serious problem for the detection, location, tracking, homing and obtaining spectral information of faint targets 14 or sources. The apparatus 10 of the instant invention is optically interposed between such background and target radiation 15 and the double-beaming apparatus 12.

Apparatus 10 is in the form of an optical mask 16 made up of a plurality of reflecting elements 18, preferably of triangular cross section having a width ($w$) and having formed therebetween spaces ($s$) 20 which allow for the transmission of radiation therethrough.

Optical mask 16 divides the field-of-view of apparatus 12 into a plurality of subfields-of-view with each of the subfields-of-view being divided into beams of light containing background radiation alone as well as beams of light containing both target and background radiation. The description of apparatus 12 will be set forth in detail hereinbelow.

One such apparatus 12 for performing the technique of double-beaming in Fourier spectroscopy is an interferometer 23 of the type described in above mentioned patent application Ser. No. 662,995. Interferometer is optically aligned by any conventional lens 22 and mirror 24 with background and target radiation 15. The background and target radiation is either transmitted through or reflected by optical mask 16 in a manner to be described in detail hereinbelow. Although, many other interferometer designs may be utilized with this invention, interferometer 23 is representative and is made up of a beamsplitter 26 and a plurality of reflecting means such as mirrors 28, 30, 32, 34 and 36. Mirrors 28, 30, 32, 34 and 36 are capable of being adjusted to the proper position by any suitable adjusting means such as a manual or motor operated gear drive 38 shown schematically in the drawing.

The motion of the target 14 across the path of optical mask 16 alternately generates a positive and negative signal; that is at times the background radiation, alone, passes through mask 16 while the background and target radiation, is reflected off mask 16. However, at times both target and background radiation pass through mask 16 while the background radiation, alone, is reflected off mask 16. For example, if in the plane of optical mask 16, the linear dimension of the imaged field of view is 1cm and the radiation of interest lies around the wavelength of 10μ, then reflecting elements 18 are constructed with a width($w$)=0.1mm separated by a distance or spacing($s$)=0.1mm. That is, in all there would be about 50 reflecting elements 18 and 50 transmitting apertures or spaces 20. Although these dimensions can be changed, for optimum results they should substantially meet the requirement that $s=w\geq 10$ times the wavelength of the background and target radiation 15.

With reference to FIG. 1 of the drawing, one field of view (containing a small target 14 and background 13 is focused onto optical mask 16 of this invention which spatially divides the field-of-view into transmitted beams (1, 2, etc.) and reflected beams (1', 2', etc.). The transmitted beam (1, 2, etc.) always strikes the same face of beamsplitter 26 while the reflected beam (1', 2', etc.) always strikes the opposite face of beamsplitter 26. Since beams 1 and 1' (or 2 and 2', etc.) enter interferometer 23 on the opposite side of beamsplitter 26, the interferograms they produce in beam 3 when mirror 32 is moved by adjusting means 38, are out of phase. Beams 1 and 1' both consist of background radiation 13, while beam 1 also has radiation from target 14. Consequently, the out-of-phase interferograms for the background result in a constant in beam 3 and the structure in the interferogram is due to the target 14 only. It makes no difference whether the target radiation 14 is in beam 1 or 1' (2 or 2', etc.) since background radiation suppression always exists. Beam 1 (2) will sometimes contain target radiation 14 and at other times beam 1' (2') will contain target radiation 14; however, at all times beams 1 and 1' (2 and 2') contain background radiation 13 and this background radiation will be suppressed.

An essential feature of the instant invention is that the interferogram from beam 3 (4) will always contain structure due to the target 14 regardless of which input path it takes; this is not true of the usual reticle chopping techniques used for spatial discrimination. In the latter technique, half of the target energy (on the average) is thrown away. Also, the spatial reticle chopping technique uses electronic means for background suppression while the invention does the suppression at an optical component and not at one or more detectors. Another important aspect of the invention is that the target radiation alternately is in one beam and then the next, essentially causing the input beams to exchange role in order to reduce instrumental defects. Another important property of the invention is that if spectral signatures are not required, then the whole optical system can be made rigid and operate as a target detection and angular velocity measurement system.

In addition the instant invention can be used in conjunction with an array of detectors 40 (mosaic, staggered, line, etc.) in the focal plane of interferometer 23. By using the optical background suppression apparatus 10 of this invention there is an optimal spatial size (angular resolution times distance between detector and background) for discriminating the target radiation 14 from the background 13. The multifaceted mask 16 of this invention divides the field-of-view of one detector of interferometer 23 into smaller spatial elements for suppression of larger scale structure. To apply this technique to larger areas of observation than a single detector element a multiple array of detectors 40 is used in the focal plane of interferometer 23. This creates a spatial interferometer where each detector produces a spectrum unique to its field of view and the mask/detector sizes can be varied to be optimum (for background suppression and target discrimination) for the particular case under consideration. The combination of the double-beaming interferometer 12, transmitting and reflecting mask 16 and detector array 40 allows one to suppress the background radiation 13 and discriminate the target radiation 14 by a simultaneous spatial and spectral technique while observing a total large field of view.

Although this invention has been described with reference to particular embodiments it should be understood to those skilled in the art that this invention is also capable of a variety of further embodiments within the spirit and scope of the appended claims.

We claim:

1. An apparatus for use during target detection comprising a plurality of reflective elements spaced a predetermined distance apart from each other for dividing structured background radiation containing said target into first beams of light containing said background radiation alone and second beams of light containing both said background radiation and said target radiation, said space between said reflective elements being substantially equal to the width of each of said reflective elements and said width being substantially equal to or greater than 10 times the wavelength of said background and target radiation, and means optically aligned with said first and said second beams of light for suppressing the radiation common to both said first and said second beams of light and for producing an output beam in the form of an interferogram having stucture due only to said target radiation.

2. An apparatus for use during target detection as defined in claim 1 wherein said suppressing means is in the form of an interferometer.

3. An apparatus for use during target detection as defined in claim 2 further comprising means optically associated with said interferometer for detecting said output beam emanating from said interferometer.

4. An apparatus for use during target detection as defined in claim 3 wherein said means for detecting said output is in the form of an array of detectors.

5. An apparatus for use during target detection as defined in claim 4 wherein said interferometer comprises means in optical alignment with said first beams of light and said second beams of light for directing each of said first and second beams in two directions and means in optical alignment with said first and second beams of light and said directing means for causing each of said first and second beams, respectively, to intersect each other at preselected locations on said directing means.

6. An apparatus for use during target detection as defined in claim 5 wherein said directing means is in the form of a beamsplitter, each of said first beams striking said beamsplitter on one face thereof and each of said second beams striking said beamsplitter on a face of said beamsplitter opposite said one face.

7. An apparatus for use during target detection as defined in claim 6 wherein a pair of each of said first and second beams, respectively, intersect each other at said beamsplitter at two places.

* * * * *